United States Patent
Iida et al.

(10) Patent No.: US 7,277,153 B2
(45) Date of Patent: Oct. 2, 2007

(54) ELASTIC PRESSURE SHEET AND PROCESS OF MANUFACTURING LIQUID CRYSTAL DISPLAY PLATE

(75) Inventors: Hiroyuki Iida, Ibaraki (JP); Junichi Moriyama, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 99 days.

(21) Appl. No.: 10/852,130

(22) Filed: May 25, 2004

(65) Prior Publication Data

US 2005/0001974 A1  Jan. 6, 2005

(30) Foreign Application Priority Data

Jun. 9, 2003  (JP)  .................. P. 2003-163558

(51) Int. Cl.
*G02F 1/13* (2006.01)
(52) U.S. Cl. ...................... 349/187; 349/189
(58) Field of Classification Search ................ 349/187, 349/189
See application file for complete search history.

(56) References Cited

U.S. PATENT DOCUMENTS

2004/0008304 A1* 1/2004 Nair et al. ................ 349/117
2004/0191678 A1* 9/2004 Vermeersch et al. ..... 430/270.1
2004/0235376 A1* 11/2004 Byma et al. .................. 442/38
2005/0233086 A1* 10/2005 Chan et al. ................. 427/402

FOREIGN PATENT DOCUMENTS

| JP | 2001-083533 A | 3/2001 |
| JP | 2003-005199 A | 1/2003 |
| JP | 2003005199 A * | 1/2003 |

* cited by examiner

*Primary Examiner*—Andrew Schechter
*Assistant Examiner*—(Nancy) Thanh-Nhan P. Nguyen
(74) *Attorney, Agent, or Firm*—Sughrue Mion, PLLC (57) ABSTRACT

An elastic pressure sheet that is good in durability against liquid crystals and the like and is good in slipperiness and a process of manufacturing a liquid crystal display plate using the same are disclosed. The elastic pressure sheet comprises an elastic layer having elastic restoring force; hot-melt adhesive layers formed on the both surfaces of the elastic layer; a barrier layer formed on the outer surface of each of the adhesive layers and capable of preventing bleeding of the hot-melt adhesive layer; and a porous layer comprising ultrahigh molecular weight polyethylene, formed on the outer surface of each of the barrier layers.

4 Claims, 3 Drawing Sheets

ELASTIC PRESSURE SHEET AND PROCESS OF MANUFACTURING LIQUID CRYSTAL DISPLAY PLATE

FIELD OF THE INVENTION

The present invention relates to an elastic pressure sheet that can be suitably used in pressurizing liquid crystal cells into which an excess of a liquid crystal is injected to discharge the excessive liquid crystal in the cell, and a process of manufacturing a liquid crystal display plate using the same.

DESCRIPTION OF THE RELATED ART

A liquid crystal display plate contains a liquid crystal cell formed by laminating (sealing) a pair of glass substrates disposed opposite each other at a prescribed interval with a sealant and a liquid crystal (liquid crystal composition) encapsulated in the liquid crystal cell. This liquid crystal is injected into the liquid crystal cell from an opening formed in the sealant, i.e., a liquid crystal injection port, and then encapsulated by an encapsulant.

In such a case, the liquid crystal cell is disposed in a vacuum chamber together with a vessel having the liquid crystal charged therein, and the vacuum chamber is evacuated for several hours, whereby the liquid crystal injection port provided in the liquid crystal cell is dipped in the liquid crystal in the state that the inside pressure of the liquid crystal cell is reduced. The vessel is released into atmospheric pressure, whereby the liquid crystal is injected into the liquid crystal cell. At this time, in some cases, the excessive liquid crystal is injected into the cell by a capillary phenomenon in addition to a difference in pressure (see FIG. 3B).

Liquid crystal cells having a liquid crystal injected thereinto are set in a jig every several tens sheets in the state that a sealant is sandwiched between the cells. When a plurality of liquid crystal cells are pressurized under a prescribed pressure by this jig, the liquid crystal excessively injected into the liquid crystal cell is discharged from the liquid crystal injection port. When the liquid crystal is discharged until the liquid crystal in the liquid crystal cell reaches a prescribed amount, an encapsulant is applied to the liquid crystal injection port. When the pressurized state of the liquid crystal cell is released by the jig, whereby the liquid crystal cell becomes in the slightly reduced pressure state, the encapsulant is sucked in the cell and cured in that state (for example, see JP-A-2001-83533).

Films or non-woven fabrics comprising polytetrafluoroethylene (PTFE) having good sliding property and releasability may be used as elastic pressure sheets that is used in discharging the excessive liquid crystal in the cell. An elastic pressure sheet is further known, which is obtained by laminating a porous layer comprising ultrahigh molecular weight polyethylene (UHMWPE) and an elastic layer through a pressure-sensitive adhesive or hot-melt adhesive (for example, see JP-A-2003-5199).

However, use of PTFE films involves problems such that the films are insufficient in elasticity; the films cause adhesion to products; and the films are limp so that the workability is poor. Use of PTFE non-woven fabrics involves problems such that the elasticity is gradually reduced and the non-woven fabrics are limp so that the workability is poor. Further, in the case where PTFE is used as a raw material, since PTFE cannot be burnt, it becomes an industrial waste. This is improper as a step material requiring periodic replacement.

On the other hand, although the elastic pressure sheet described in JP-A-2003-5199 solved the problems involved in the above-described PTFE sheets and PTFE non-woven fabric, it was not satisfied with the durability in the case where a tackifier was used in laminating the UHMWPE porous layer and the elastic layer. This is caused especially due to solvent resistance. For example, in the manufacturing step of a liquid crystal, the liquid crystal itself, or a rinsing liquid or the like in other steps, invaded into a tackifier mainly used for laminating the respective layers, thereby causing a separation phenomenon. Further, even in the case where a hot-melt adhesive that is relatively durable against the liquid crystal or rinsing liquid is used in place of the tackifier, the hot-melt adhesive bled out on the surface of the UHMWPE porous layer and possibly reduced slipperiness as a characteristic feature of the UHMWPE porous layer.

SUMMARY OF THE INVENTION

Accordingly, one object of the present invention is to provide an elastic pressure sheet that is good in durability against liquid crystals and the like, is free from bleeding of an adhesive on the surface of an UHMWPE porous layer and is good in slipperiness.

Another object of the present invention is to provide a process of manufacturing a liquid crystal display plate using the elastic pressure sheet.

As a result of extensive and intensive investigations to achieve the above objects, it has been found that when with respect to an elastic pressure sheet to be interposed in pressurizing a liquid crystal cell, an elastic layer is adhered to an UHMWPE porous body through a barrier layer using a hot-melt adhesive layer, the elastic pressure sheet that is good in durability against liquid crystals and the like, is free from bleeding of the adhesive on the surface of the UHMWPE porous layer and is good in slipperiness can be obtained. The present invention has been completed based on this finding.

The elastic pressure sheet according to the present invention comprises an elastic layer having elastic restoring force; hot-melt adhesive layers formed on the both surfaces of the elastic layer; a barrier layer formed on the outer surface of each of the adhesive layers and capable of preventing bleeding of the hot-melt adhesive layer; and a porous layer comprising ultrahigh molecular weight polyethylene, formed on the outer surface of each of the barrier layers.

According to the elastic pressure sheet of the present invention, a barrier layer for preventing bleeding of an adhesive layer is provided between the adhesive layer and a porous layer. As a result, it is possible to prevent bleeding of the adhesive layer and to obtain good slipperiness inherent to an UHMWPE porous body. Further, since a hot-melt adhesive layer is used, the durability against liquid crystals and the like is good as demonstrated in the results of the Examples.

In the above construction, it is preferable that the barrier layer is a single body of a film comprising a polyolefin resin as the major component or a composite of a film comprising a polyolefin resin as the major component and other material. In the case where the barrier layer comprises a polyolefin resin, its adhesion to the UHMWPE porous layer is good due to heat fusion or the like, whereby the durability in a long-term use is improved.

It is preferable that at least one of the constitutional layers is subjected to antistatic treatment. The antistatic treatment makes it possible to prevent that separation of the liquid crystal and the elastic pressure sheet is difficult due to static electricity and to inhibit adhesion of foreign matters due to static electricity.

It is preferable that at least one of the constitutional layers is subjected to water repellent treatment. The "water repellent treatment" as referred to herein means a concept including water repellent/oil repellent treatments. The water repellent treatment makes it possible to inhibit invasion of chemicals or the like into the porous layer, thereby further enhancing durability.

The process of manufacturing a liquid crystal display plate according to the present invention comprises:

a step of pressurizing liquid crystal cells, each of which is sealed while remaining a liquid crystal injection port and into which an excess of a liquid crystal is injected, through a elastic pressure sheet to discharge the excessive liquid crystal in the cell; and a step of encapsulating the liquid crystal injection port of the liquid crystal cell in the state that a prescribed amount of the liquid crystal is present in the cell;

wherein the elastic pressure sheet comprises an elastic layer having elastic restoring force; hot-melt adhesive layers formed on the both surfaces of the elastic layer; a barrier layer formed on the outer surface of each of the adhesive layers and capable of preventing bleeding of the hot-melt adhesive layer; and a porous layer comprising ultrahigh molecular weight polyethylene, formed on the outer surface of each of the barrier layers.

According to the process of manufacturing a liquid crystal display plate of the present invention, since an elastic pressure sheet having good durability against liquid crystals and the like and having good slipperiness is used, it is possible to repeatedly use the elastic pressure sheet over a long period of time and to suitably undergo works such as lamination or separation of the liquid crystal display plate and the sheet.

In the drawings:
1: Elastic layer
2: Hot-melt adhesive layer
3: Barrier layer
4: Porous layer
107: Liquid crystal injection port
108: Encapsulant
300: Liquid crystal
PS: Elastic pressure sheet
L: Liquid crystal cell

DETAILED DESCRIPTION OF THE INVENTION

The present invention is described in detail by reference to the accompanying drawings.

Figure 1A:
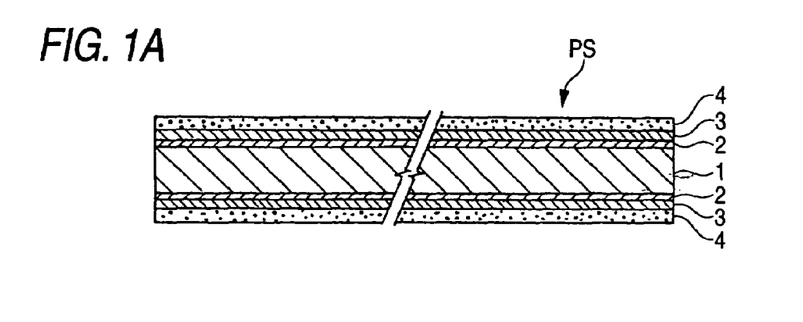
FIG. 1 is a cross-sectional view showing various embodiments of the elastic pressure sheet of the present invention.
Figure 1B:
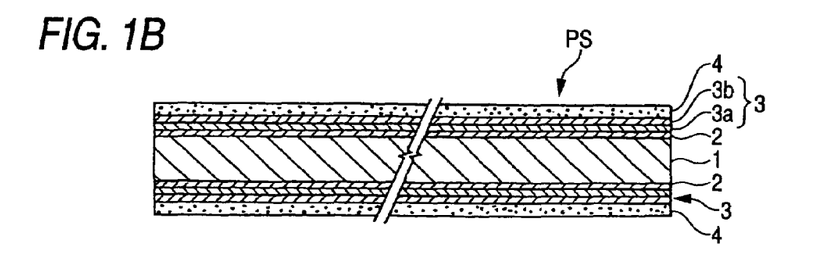

FIG. 1A and FIG. 1B are cross-sectional views showing various embodiments of the elastic pressure sheet of the present invention.

The elastic pressure sheet of the present invention can suitably be used in pressurizing liquid crystal cells into which an excess of a liquid crystal is injected, thereby discharging the excessive liquid crystal in the cell. As shown in FIG. 1A, the elastic pressure sheet of the present invention is provided with an elastic layer 1 having elastic restoring force; hot-melt adhesive layers 2 formed on the both surfaces of the elastic layer 1; a barrier layer 3 formed on the outer surface of each of the adhesive layers 2 and capable of preventing bleeding of the hot-melt adhesive layer 2; and a porous layer 4 comprising UHMWPE polyethylene formed on the outer surface of each of the barrier layers 3. As shown in FIG. 1B, the barrier layer 3 may be constituted of two layers consisting of an inner layer 3a and an outer layer 3b, or may be constituted of three or more layers.

Thus, according to the present invention, the porous layers 4 comprising UHMWPE polyethylene are formed on the both surfaces of the sheet, and the elastic layer 1 having elastic restoring force is disposed in the middle thereof. Thus, since the porous layers 4 comprising UHMWPE polyethylene provided on the both surfaces have releasability and slidability, and the elastic layer 1 is provided in the middle thereof, displacement absorption can suitably be performed in lamination and pressurization, and pressurization by elastic restoring force can be suitably performed. Further, since the elastic layer 1 is provided, permanent set is difficult to generate.

The porous layer 4 comprises a porous body of UHMWPE having low coefficient of friction and excellent abrasion resistance. UHMWPE has an advantage that it is inexpensive. UHMWPE has a molecular weight of 500,000 or more, and UHMWPE having a molecular weight of 1,000,000 or more is preferable from the standpoint of abrasion resistance. Examples of the UHMWPE include HI-ZEX MILLION (a trade name, manufactured by Mitsui Chemical, Inc.) and HOSTALEN GUR (a trade name, manufactured by Tinaco Polymerwerke). The molecular weight as referred to herein means a measured value by the viscometry.

Examples of the method of preparing a porous sheet comprising UHMWPE include extraction and sintering. Of those, the sintering process previously proposed by the present inventor (JP-B-5-66855) is preferable from the standpoints of coefficient of friction, pore size of the porous sheet prepared, etc.

For example, the sintering process is a process in which the UHMWPE powder is filled in a mold, heated at a temperature lower than the melting point of UHMWPE, and then pressurized under a prescribed pressure to prepare a preliminarily molded product; the preliminarily molded product is placed in a reduced pressure atmosphere to remove air in the preliminarily molded product and sintered in a steam atmosphere heated at the melting point of UHMWPE or higher; and after cooling, the sintered molded product is released from the mold to obtain a porous body in a block shape in which open cells are formed. This porous body is cut into a prescribed thickness to form a sheet.

The thickness and porosity of the UHMWPE porous body are appropriately determined, but the thickness and porosity preferably are 0.03-2.0 mm and 10-70%, respectively. If the thickness is smaller than this range, the mechanical strength of the porous body decreases, thereby possibly causing breakage when using the same. As a result, the workability in lamination may deteriorate. On the other hand, if the thickness is larger than the above range, the thickness as an elastic pressure sheet is too large, so that a working space in lamination tends to be large. Further, if the porosity is less than 10%, the coefficient of friction of the porous layer tends to increase, whereas if it exceeds 70%, the mechanical strength of the porous sheet tends to decrease. The porosity is calculated according to the following equation.

$$\text{Porosity (\%)} = \{1-[(\text{Apparent density})/(\text{True specific gravity of UHMWPE})]\} \times 100$$

For the antistatic purpose, the UHMWPE porous body may contain an antistatic agent such as surfactants or conductive polymers. Besides, the UHMWPE porous body may contain carbon black or a conductive polymer in molding so as to impart antistatic property to the porous body.

Material of the elastic layer 1 is that the material itself is an elastic body, and examples thereof include rubbers (for example, fluorocarbon rubbers, silicone rubbers, acrylonitrile-butadiene rubbers, ethylene-propylene rubbers, and butyl rubbers) and thermoplastic elastomers (for example, polyolefin based thermoplastic elastomers).

Even when a material itself is not an elastic body, a material having pores, thereby exhibiting elasticity may be used. As a matter of course, a material that is elastic itself and has pores may also be used.

The pores of the elastic layer 1 may be either open cells or closed cells. However, closed cells are preferable from the standpoints of elasticity and permanent set. Foamed products of the above-described rubbers or thermoplastic elastomers and foamed products of urethane resin or the like can be used as foamed products having closed cells. Examples of the foamed product having open cells include porous sheets of various resins and open cell foamed products of various resins. In the present invention, foamed products of a thermoplastic resin or thermoplastic elastomer are preferably used from the standpoint of reuse.

The elastic layer 1 preferably has a thickness of 0.015-2 mm, and more preferably 0.2-1.5 mm. If the thickness is too thin, the displacement absorption or elastic restoring force tends to be insufficient. On the other hand, if the thickness is too thick, it is disadvantageous in the economical standpoint, and a working space in lamination tends to increase.

The elastic restoring force of the elastic layer 1 can be expressed by a repulsion strength defined according to JIS K6254. Specifically, a sample is compressed, and its repulsion force when the thickness becomes 75% of that prior to the compression is measured (at a temperature of 25° C. and at a compression rate of 1 mm/min). The repulsion force is preferably 0.005-0.5 MPa, and more preferably 0.01-0.1 MPa.

The elastic layer 1 may be impregnated with an antistatic agent, such as surfactants or conductive polymers, for the antistatic purpose. Alternatively, carbon black or a conductive polymer may be compounded with the elastic layer 1 in molding so as to impart antistatic property to the elastic layer.

The barrier layer 3 preferably comprises a material having good adhesion to the UHMWPE porous body. Examples of such a material include films of polyolefins such as polyethylene or polypropylene. Sheets obtained by laminating such a film itself, or sheets obtained by laminating such a film and a high-strength sheet (for example, polyethylene terephthalate (PET) or polyimides) through an adhesive layer may also be used as the barrier layer.

Sheets obtained by copolymerizing polyethylene as a base material with an adhesive component can further be used. In this case, use of this sheet in combination with the high-strength sheet increases the strength and is preferable from the standpoint of workability.

A method of laminating the barrier layer 3 with the UHMWPE porous layer 4 is, for example, a method in which the both layers are heat fused by passing through a pair of heated rollers. However, in the case where the volume of the barrier layer 3 is very large relative to the porosity of the UHMWPE porous layer 4, and the melt viscosity of the constitutional materials of the barrier layer 3 is very small, the constitutional materials of the barrier layer 3 may bleed out from the pores of the porous layer 4.

To avoid the above possible problems, for example, it is preferable to use films having a high melt viscosity, such as crosslinked polyethylene. The crosslinked polyethylene can be obtained by irradiating conventional polyethylene with an appropriate amount of electron beams. When electron beams hit the molecule of polyethylene, mutual bonding of the molecules occurs, whereby a molecule having a three-dimensional bond is formed (crosslinking). In such a state, even when the polyethylene reaches the melting point, the film shape is maintained to a certain extent. Use of such a film as the barrier layer 3 can prevent bleeding of the constitutional materials of the barrier layer 3 from the pores of the UHMWPE porous layer 4.

The melt viscosity of crosslinked polyethylene or the like as the barrier layer 3 can be measured using a viscoelasticity measuring apparatus under a condition at a temperature 200° C. and a frequency of 1 rad/sec. The melt viscosity is preferably 5-500 kPa, and more preferably 10-200 kPa.

Sheets obtained by laminating polyethylene having a thickness such that the barrier layer 3 does not bleed out from the pores of the UHMWPE porous layer 4, on a PET film through other adhesive layer are also suitably used. The characteristic of such a material is that since PET secures the strength of the film, the thickness of the polyethylene used for adhesion to the UHMWPE porous layer 4 can be decreased as possible. Examples of such a material include CAPOLLA E GUARD, trade name, manufactured by Kaito Chemical Industry Co., Ltd.

The thickness of the barrier layer 3 varies depending upon the porosity and thickness of the UHMWPE porous layer 4, but is preferably about 0.005-0.20 mm. If the thickness is less than 0.005 mm, inconveniences such as generation of a hole may occur, and therefore, such is not preferable from the standpoint of workability. On the other hand, if the thickness exceeds 0.20 mm, the overall thickness of the elastic pressure sheet increases, so that in working using such a thick elastic pressure sheet, the space efficiency may deteriorate. Similar to the porous layer 4 and elastic layer 1, the barrier layer 3 may have an antistatic property.

Material for the hot-melt adhesive layer 2 is not particularly limited so long as it has an adhesive force sufficient for laminating the respective layers, and the material can appropriately be selected according to the material quality of the barrier layer 3 or elastic layer 1. For example, where the barrier layer 3 is a polyethylene film, modified hot-melt adhesives comprising polyethylene can be used. Examples of such materials include BONDFAST (trade name, manufactured by Sumitomo Chemical Co., Ltd.) and ADMER (trade name, manufactured by Mitsui Chemical, Inc.). Those materials can be used in a form of a sheet.

The thickness of the adhesive layer 2 is not particularly limited, but is preferably about 0.01-0.50 mm. If the thickness is less than 0.01 mm, sufficient adhesive force to the respective layers may not be obtained. On the other hand, if the thickness exceeds 0.50 mm, the overall thickness of the elastic pressure sheet increases, so that in working using such an elastic pressure sheet, the space efficiency may deteriorate.

A method of laminating the adhesive layer 2 with other materials is, for example, a method in which those layers are heat fused by passing through a pair of heated rollers. Further method can be used, which comprises superposing the respective materials in order on a flat metal plate having an appropriate thickness, placing other flat metal plate thereon, applying a moderate load, and maintaining the resulting assembly at an appropriate temperature for an appropriate period of time in a hot air circulation type dryer, thereby adhering the assembly. This method may be combined with the above-described method of passing the layers through rollers. The surface of each of the layers may be subjected to easy adhesion treatment such as corona discharge treatment.

Preferably, at least one of the constitutional layers in the elastic pressure sheet is subjected to antistatic treatment. Applying the antistatic treatment enables the liquid crystal to be easily separated from the elastic pressure sheet due to static electricity in a liquid crystal manufacturing step, or can increase an effect for preventing contamination of foreign matters.

The antistatic treatment is preferably that at least one of the constitutional layers is impregnated with an antistatic agent such as anionic or cationic antistatic agents by coating, spraying or the like, thereby holding the antistatic agent in the sheet. Examples of the antistatic agent include commercially available products such as ELECTROSTRIPPER, trade mark, manufactured by Kao Corporation and ELECTNONE ORW, trade mark, manufactured by New Fine Chemical Co., Ltd.

Such antistatic treatment can be applied to the whole elastic pressure sheet after laminating the respective layers. The antistatic treatment may be applied to any one of the respective layers, followed by lamination. Alternatively, the antistatic treatment may be conducted by kneading carbon or the like at the stage of manufacturing the respective layers. Apply the antistatic treatment to the side face of each layer is also preferable.

In the elastic pressure sheet of the present invention, it is preferable that at least one of the constitutional layers is subjected to water repellent treatment. It is especially preferred to apply water repellent/oil repellent treatments from the standpoint of preventing invasion of various chemicals and the like. It is sufficient only if the water repellent/oil repellent treatments are applied to the UHMWPE porous layer 4. Of course, the repellent/oil repellent treatments can be applied to the whole elastic pressure sheet. A water repellent/oil repellent treating agent that can be used is specifically various fluorine-containing polymers. Polymers containing a fluorine-containing chain form a film of low surface energy on the surface of the fine structure of the porous layer 4 to exhibit a water repellent/oil repellent effect. Apply the water repellent treatment to the side face of each layer is also preferable.

Fluorine-containing polymers are preferably polymers containing a perfluoroalkyl group. Examples of the perfluoroalkyl group-containing polymers that can be used are commercially available water repellent/oil repellent treating agents such as FLUORAD (trade name, manufactured by Sumitomo 3M Ltd.), SCOTCHGARD (trade name, manufactured by Sumitomo 3M Ltd.), TEXGARD (trade name, manufactured by Daikin Industries, Ltd.), UNIDYNE (trade name, manufactured by Daikin Industries, Ltd.), and ASAHI GUARD (trade name, manufactured by Asahi Glass Co., Ltd.). The water repellent/oil repellent treatment is carried out by impregnation of the water repellent/oil repellent treating agent, or coating or spraying the water repellent/oil repellent treating agent. It is preferred to adjust the coating amount of the water repellent/oil repellent treating agent so as to obtain sufficient water repellent/oil repellent properties.

Other water repellent treatment is, for example, a treatment with a hydrophobic compound such as paraffin waxes, silicones, or fluoroalkylated (meth)acrylic acid esters.

Figure 3A:
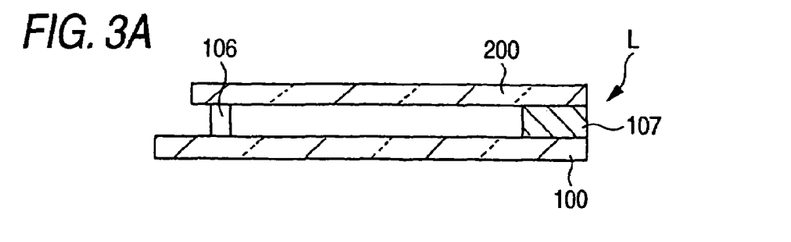
FIG. 3 is a step view showing one embodiment of the manufacturing process of a liquid crystal plate of the present invention.
Figure 3B:
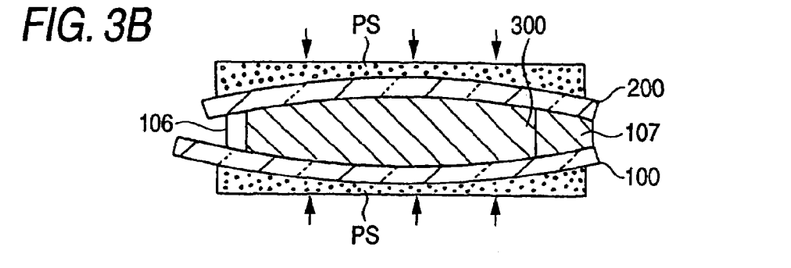
Figure 3C:
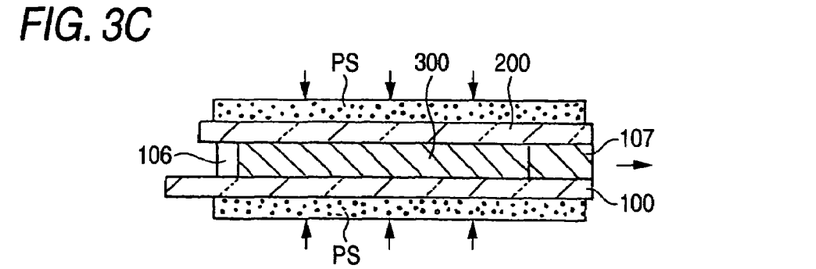
Figure 3D:
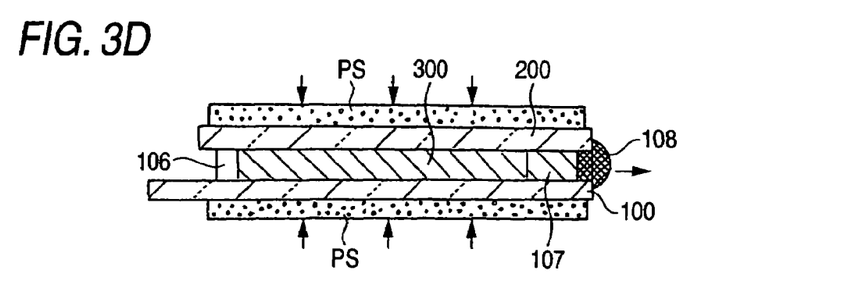
Figure 3E:
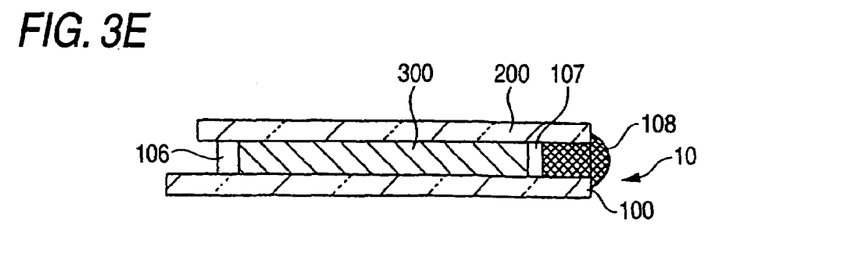
Figure 4:
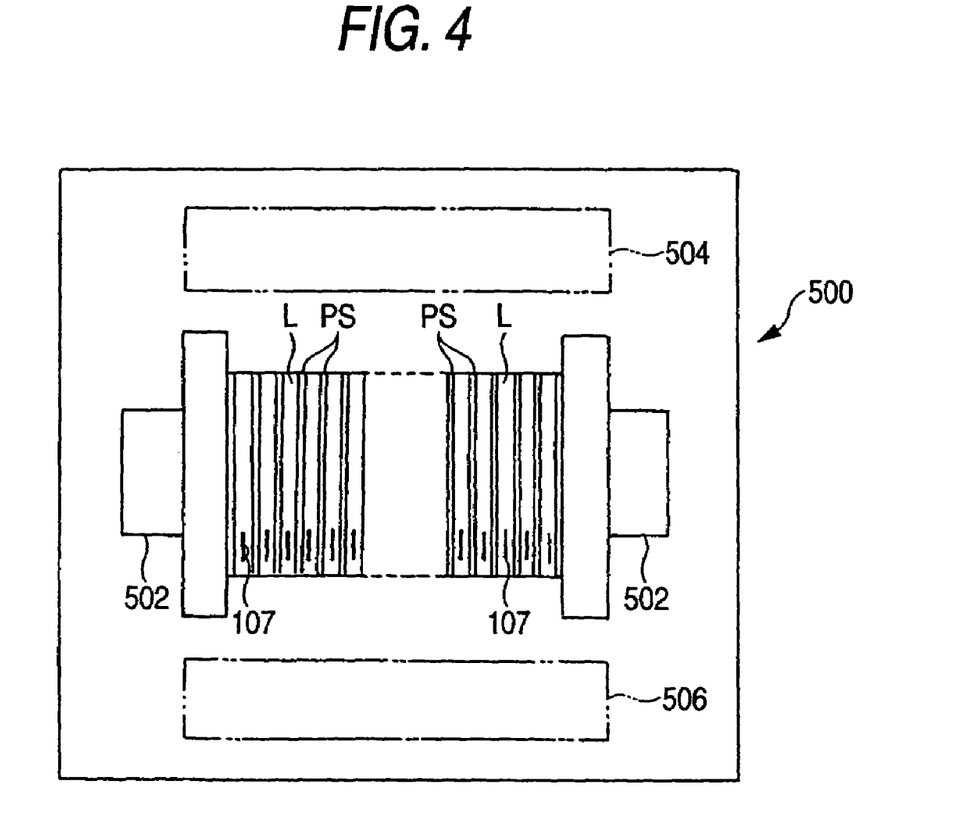
FIG. 4 is a plane view showing one embodiment of the laminated and pressurized state in the manufacturing process of a liquid crystal plate of the present invention.

The process of manufacturing the liquid crystal display plate according to the present invention comprises a step of pressurizing a plurality of liquid crystal cells L through an elastic pressure sheet PS having the construction described above in the laminated state, to discharge an excess of a liquid crystal 300 in the cell; and a step of encapsulating a liquid crystal injection port 107 of each of the liquid crystal cells L in the state that a prescribed amount of the liquid crystal 300 is present in the cell, as shown in FIGS. 3 and 4.

Figure 2:
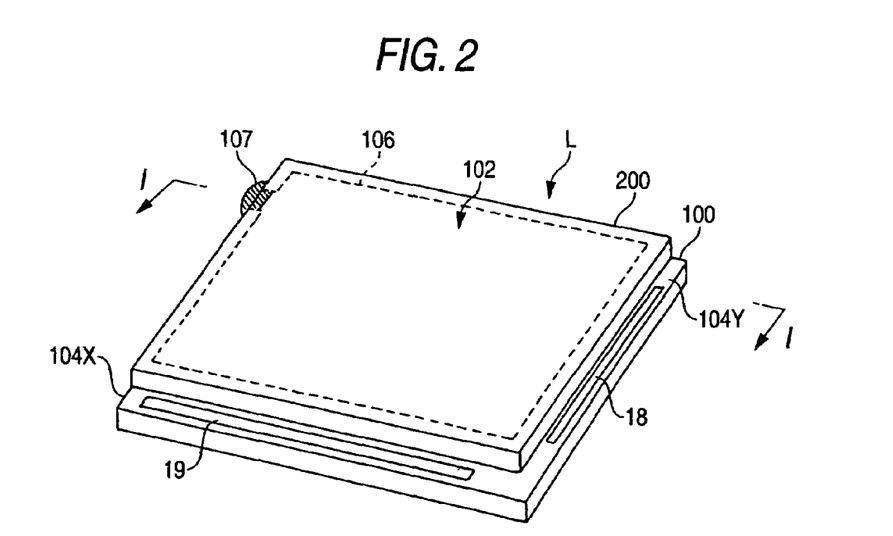
FIG. 2 is a perspective view showing one embodiment of the liquid crystal cell in the present invention.

As shown in FIG. 2, the liquid crystal cell L used is sealed while remaining the liquid crystal injection port 107, and an excess of a liquid crystal is injected thereinto. In more detail, for example, the liquid crystal cell L comprises an array substrate 100 as a first substrate, a counter array substrate 200 as a second substrate provided facing the array substrate 100, and a liquid crystal 300 provided between the array substrate 100 and the opposed substrate 200. In the liquid crystal cell L, a display area 102 displaying an image is formed within a region surrounded by a sealant 106 for laminating the array substrate 100 and the opposed substrate 200, and a peripheral area 104 having various wiring patterns led from the inside of the display area 102 and a drive circuit is formed in a region outside the sealant 106. The sealant 106 is coated except for the liquid crystal injection port 107 for injecting the liquid crystal 300 into a space between the array substrate 100 and the counter substrate 200.

The display area 102 of the array substrate 100 comprises a transparent insulating substrate, for example, a glass substrate having a thickness of 0.7 mm, having thereon a plurality of pixel electrodes provided in the matrix state, scanning lines formed along the line directions of the pixel electrodes, signal lines along the row directions of the pixel electrodes, a plurality of thin film transistors, TFTs provided as a switching element in the vicinity of the position at which the scanning line and the signal line are crossed corresponding to the pixel electrode, a scanning line drive circuit, a signal line drive circuit, and the like.

The surface of the pixel electrode is covered by an oriented film for orienting the liquid crystal 300 interposed between the pixel electrode and the counter substrate 200. A scanning line drive circuit 18 provided in a peripheral area 104Y successively supplies a scanning voltage to the scanning line at a horizontal scanning period, and a signal line drive circuit 19 provided in a peripheral area 104X supplies a pixel signal voltage to the signal line at each horizontal scanning period.

A spacer (not shown) for forming a gap of about 5 μm between the array substrate 100 and the counter substrate 200 is provided on non-image portions in the display area 102 and peripheral area 104 (X, Y) of the array substrate 100, that is, wiring patterns such as signal lines and scanning lines, TFT, and peripheral edge portion, whereby a gap is set up between the array substrate 100 and the counter substrate 200. With respect to the spacer, spherical spacers may be sprayed and provided, or spacers may be formed integrally with the substrate.

The display area 102 of the counter substrate 102 comprises a transparent insulating substrate, for example, a glass substrate having a thickness of 0.7 mm, having thereon a counter electrode made of a transparent conductive member for forming a potential difference between the insulating substrate and a pixel electrode (not shown), for example, iridium-tin-oxide, i.e., ITO, and an oriented film for orienting the liquid crystal 300 interposed between the insulating substrate and the array substrate 100.

The counter electrode is set up at the standard potential opposing to a plurality of pixel electrodes. An electrode transfer material provided in the circumference of the substrate, that is, a silver paste as the transfer, is provided for supplying a voltage from the array substrate 100 into the counter substrate 200, and the counter electrode is driven by a counter electrode drive circuit connected through the transfer.

If necessary, a display mode of a liquid crystal display device and a polarizing plate whose plane of polarization is chosen according to a twist angle of liquid crystal and the like are later provided on the front and back surfaces of the liquid crystal cell, that is, on the external surfaces of the array substrate 100 and the counter substrate 200.

The manufacturing process of the liquid crystal display plate is described below. FIGS. 3A to 3E are each a step view corresponding to the I-I cross-section of the liquid crystal cell shown in FIG. 2.

First of all, as shown in FIG. 3A, the sealant 106 is coated so as to surround the display area 102 of the array substrate 100 or counter substrate 200 except the liquid crystal injection port 107, thereby laminating the array substrate 100 and the counter substrate 200, and the sealant 106 is then cured. Thus, the liquid crystal cell L is formed.

As shown in FIG. 3B, the liquid crystal 300 is injected into the liquid crystal cell L through the liquid crystal injection port 107. That is, the liquid crystal cell L is held in the laminated state of a plurality of sheets thereof, for example, 25 sheets, by a holding mechanism provided in a vacuum chamber of a liquid crystal injection device. A liquid crystal boat containing a liquid crystal having been subjected to defoaming treatment is provided in the vacuum chamber. The vacuum chamber is evacuated for a prescribed period of time (for example, about 5 hours) through an exhaust valve. Thus, the inside of each of the liquid crystal cells L is evacuated from the liquid crystal injection port, whereby the pressure in the cell is reduced.

Each of the liquid crystal cells L held by the holding mechanism is dipped in the liquid crystal 300 filled in the liquid crystal boat for a prescribed period of time (for example, about 4 hours). At this time, by gradually returning the pressure in the vacuum vessel to atmospheric pressure, the liquid crystal 300 is injected into the liquid crystal cell L due to a difference in pressure from that in the liquid crystal cell L and a capillary phenomenon. Thus, when the liquid crystal 300 is injected into the liquid crystal cell L, a slight excess of the liquid crystal 300 is injected into the liquid crystal 300 as shown in FIG. 3B.

A plurality of the liquid crystal cells L are laminated through the elastic pressure sheet PS and held under pressure by a holding mechanism 502 of a liquid crystal encapsulation device 500 as shown in FIG. 4. Thus, the excess of the liquid crystal 300 is discharged from the liquid crystal cell L into which the excessive liquid crystal 300 has been injected, as shown in FIGS. 3B to 3C.

In such a case, although the liquid crystal L is pressurized under a prescribed pressure, for example, 150 kgf, the elastic pressure sheet PS temporarily absorbs the displacement, and pressurization by elastic restoring force is then carried out. Each of the liquid crystal cells L held by the holding mechanism 502 may be heated at a prescribed temperature for a prescribed period of time from its periphery by means of a heating device 504 such as a heater. When the liquid crystal 300 injected into the liquid crystal cell L is heated, not only its viscosity decreases, but also its volume increases. By controlling the pressure and heating temperature, it is possible to control the amount of the liquid crystal 300 discharged from the liquid crystal injection port 107.

As shown in FIG. 3D, an encapsulant 108 is coated on the liquid crystal injection port 107 in the sate that the amount of the liquid crystal 300 in the liquid crystal cell L is a prescribed amount. The "prescribed amount" as referred to herein means the amount of the liquid crystal 300 corresponding to the volume in the liquid crystal cell L in the state that a gap between the array substrate 100 and the counter substrate 200 in the liquid crystal cell L is adequately maintained at ordinary temperature.

That is, in the liquid crystal cell L having a prescribed amount of the liquid crystal 300, the encapsulant 108 comprising an ultraviolet-curable resin is coated on the liquid crystal injection port 107 by a dispenser (not shown) in the state that the liquid crystal cell L is held under pressure by the holding mechanism 502 as shown in FIG. 4. The coated encapsulant 108 is provided at the terminal face of the liquid crystal cell L.

The liquid crystal cell L is cooled, thereby sucking the encapsulant 108 into the liquid crystal cell L and curing the encapsulant 108 as shown in FIG. 3E. That is, the liquid crystal cell L on which the encapsulant 108 has been coated is reduced in pressure in the state that it is held by the holding mechanism 502 as shown in FIG. 4. In such a case, for example, the liquid crystal cell L is reduced in pressure from 150 kgf to about 100 kgf. Further, each of the liquid crystal cells L held by the holding mechanism 503 is cooled at a prescribed temperature for a prescribed period of time from its periphery by means of a cooling device 506 such as air blow.

In the liquid crystal 300 into which the liquid crystal cell L has been injected, when it is cooled, its volume is contracted; and when pressure is reduced, the encapsulant 108 provided at the terminal face of the liquid crystal cell L is sucked into the liquid crystal cell L. The encapsulant 108 sucked into the liquid crystal cell L is cured upon irradiation with ultraviolet rays or the like. A liquid crystal plate in which the liquid crystal 300 has been sealed in the liquid crystal cell L is manufactured through the above-described steps.

The present invention is described in more detail by reference to the following Examples, but is should be understood that the invention is not construed as being limited thereto.

EXAMPLE 1

An UHMWPE powder (molecular weight: 5,000,000, melting point: 135° C.) was filled in a mold and heated and compressed at 125° C. to prepare a preliminarily molded product. This preliminarily molded product was further heated at 160° C. (in a steam atmosphere) for sintering and then cooled to obtain a round bar-shaped porous body (porosity: 30%). This porous body was cut into a sheet having a thickness of 0.20 mm using a lathe. Thus, an UHMWPE porous sheet was obtained.

A sheet made of polyethylene having a density of 0.923 g/cm$^3$ (thickness: 0.03 mm) was crosslinked by irradiation with 100 kGy electron beams in air to obtain a barrier sheet (melt viscosity: 30 kPa). The UHMWPE porous sheet and the barrier sheet were passed through rubber rollers at a rate of 0.5 m/min, whereby the both were laminated on each other. In this case, only the rubber roller of the barrier sheet side was heated at 135° C. The laminate, an adhesive, and an elastic layer were laminated in the following order.

Laminate/Adhesive/Elastic Layer/Adhesive/Laminate

An adhesive prepared by melting BONDFAST 7B (trade name, manufactured by Sumitomo Chemical Co., Ltd.) in a pellet form with a press heated at 120° C. and forming the melt into a film having a thickness of 0.15 mm was used as the adhesive. A foamed product of urethane resin (thickness: 1.0 mm, closed cells, porosity: 70%, elastic restoring force: 0.04 MPa) was used as the elastic layer. The laminate was placed on a SUS plate having a thickness of 2 cm, on which was then placed a SUS plate having a thickness of 2 cm. Further, a weight was placed thereon such that the total load was 0.05 kgf/cm$^2$. The assembly was placed in a hot air circulation type dryer at 130° C. and allowed to stand for 2 hours. The assembly was taken out and allowed to stand until it reached room temperature. The resulting laminate was dipped in an antistatic agent (ELECTROSTRIPPER QN, manufactured by Kao Corporation) diluted with water so as to control its solid content to 0.3% by weight, and then air dried at room temperature, to conduct antistatic treatment. The resulting laminate was further dipped in a water repellent/oil repellent agent obtained by diluting UNIDYNE TG-725 (manufactured by Daikin Industries, Ltd.) with toluene so as to control its solid content to 1% by weight, and then air dried at room temperature, to conduct water repellent/oil repellent treatment. Those antistatic treatment and water repellent/oil repellent treatment were applied to the UHMWPE layer as the outermost layer. Further, the side face of each of the layers was subjected to antistatic treatment and water repellent/oil repellent treatment.

EXAMPLE 2

A laminate film (a trade name: CAPOLLA E GUARD, manufactured by Kaito Chemical Industry Co., Ltd.) consisting of a polyethylene layer (thickness: 25 μm) and a PET layer (thickness: 12 μm) was prepared (for a barrier layer). The polyethylene side of this laminate film was contacted with the UHMWPE porous sheet, and a rubber roller was heated at 120° C., to obtain a laminate of the UHMWPE porous sheet and the laminate film (barrier layer). An elastic pressure sheet was obtained in the same manner as in Example 1, except for using this laminate.

COMPARATIVE EXAMPLE 1

An elastic pressure sheet was obtained by using an acrylic pressure-sensitive adhesive double-coated tape (No. 532, manufactured by Nitto Denko Corporation, thickness: 0.125 mm) as the adhesive layer and laminating the UHMWPE porous sheet and the elastic layer of Example 1. The lamination used was a method of passing an assembly through a pair of rollers at a rate of 0.5 m/min. The rollers were not heated, and the lamination was carried out at room temperature. The resulting laminate was subjected to antistatic treatment in the same manner as in Example 1.

COMPARATIVE EXAMPLE 2

An elastic pressure sheet was obtained by further subjecting the elastic pressure sheet of Comparative Example 1 to water repellent/oil repellent treatment in the same manner as in Example 1.

COMPARATIVE EXAMPLE 3

An elastic pressure sheet was prepared in the same manner as in Example 1, except that the barrier layer was not provided. However, in the completed elastic pressure sheet, bleeding of the adhesive layer from the UHMWPE porous sheet was observed, and therefore, this elastic pressure sheet was improper for the intended use in the present invention Evaluation Results The adhesive force of each of the prepared elastic pressure sheets was measured. The adhesive force (unit: N/20 mm) after dipping the sheet a liquid crystal for one hour was measured. The measurement conditions were the tensile rate: 300 mm/min, and the sample width: 20 mm. The results obtained are shown in the Table below.

TABLE

|  | Adhesive force at the initial stage | Adhesive force after dipping |
| --- | --- | --- |
| Example 1 | 9.2 | 9.3 |
| Example 2 | 9.0 | 8.9 |
| Comparative Example 1 | 2.4 | 0.2 |
| Comparative Example 2 | 2.3 | 2.1 |

As is clear from the results shown in the Table above, in the Examples even after dipping in the liquid crystal for one hour, no change in the interlaminar adhesive force is observed (in this case, the adhesive force is due to cohesive failure of the foamed product of urethane resin). However, in Comparative Example 1, the adhesive force is largely lowered by dipping, so that the elastic pressure sheet of the Comparative Example 1 cannot be put into practical use. In Comparative Example 2, although the adhesive force can be prevented from lowering by the water repellent/oil repellent treatment, the adhesive force at the initial stage is low so that it is expected that separation gradually occurs in long-term use (the adhesive force of Comparative Examples 1 and 2 is due to interlaminar separation between the pressure-sensitive adhesive double-coated tape and UHMWPE). In Comparative Example 3, as described previously, slipperiness as the characteristic feature of the UHMWPE porous sheet is hindered by bleeding of the adhesive layer so that the elastic pressure sheet of the Comparative Example 3 is improper for the intended use in the present invention.

It should further be apparent to those skilled in the art that various changes in form and detail of the invention as shown and described above may be made. It is intended that such changes be included within the spirit and scope of the claims appended hereto.

This application is based on Japanese Patent Application No. 2003-163558 filed Jun. 9, 2003, the disclosure of which is incorporated herein by reference in its entirety.

What is claimed is:

1. An elastic pressure sheet comprising an elastic layer having elastic restoring force; hot-melt adhesive layers formed on the both surfaces of the elastic layer; a barrier layer formed on the outer surface of each of the adhesive layers, each barrier layer being a single body of a film comprising a polyolefin resin or a composite of a film comprising a polyolefin resin and another material and being capable of preventing bleeding of the hot-melt adhesive layer; and a porous layer comprising ultrahigh molecular weight polyethylene, formed on the outer surface of each of the barrier layers.

2. The elastic pressure sheet as claimed in claim 1, wherein at least one of the layers is subjected to antistatic treatment.

3. The elastic pressure sheet as claimed in claim 1, wherein at least one of the layers is subjected to water repellent treatment.

4. A process of manufacturing a liquid crystal display plate comprising:

a step of pressurizing liquid crystal cells, each of which is sealed while remaining a liquid crystal injection port and into which an excess of a liquid crystal is injected, through a elastic pressure sheet to discharge the excessive liquid crystal in the cell; and a step of encapsulating the liquid crystal injection port of the liquid crystal cell in the state that a prescribed amount of the liquid crystal is present in the cell;

wherein the elastic pressure sheet comprises an elastic layer having elastic restoring force; hot-melt adhesive layers formed on the both surfaces of the elastic layer; a barrier layer formed on the outer surface of each of the adhesive layers, each barrier layer being a single body of a film comprising a polyolefin resin or a composite of a film comprising a polyolefin resin and another material and being capable of preventing bleeding of the hot-melt adhesive layer; and a porous layer comprising ultrahigh molecular weight polyethylene, formed on the outer surface of each of the barrier layers.

* * * * *